Oct. 17, 1950 G. J. SIEZEN 2,526,426

CIRCUIT ARRANGEMENT FOR AMPLIFYING ELECTRICAL SIGNALS

Filed Jan. 16, 1948 2 Sheets-Sheet 1

INVENTOR.
GERRIT JAN SIEZEN
BY
Fred M. Vogel
AGENT

CIRCUIT ARRANGEMENT FOR AMPLIFYING ELECTRICAL SIGNALS

Filed Jan. 16, 1948 2 Sheets-Sheet 2

INVENTOR.
GERRIT JAN SIEZEN
BY Fred M. Vogel
AGENT

UNITED STATES PATENT OFFICE 2,526,426

CIRCUIT ARRANGEMENT FOR AMPLIFYING ELECTRICAL SIGNALS

Gerrit Jan Siezen, Eindhoven, Netherlands, assignor to Hartford National Bank and Trust Company, Hartford, Conn., as trustee Application January 16, 1948, Serial No. 2,787
In the Netherlands January 24, 1947

3 Claims. (Cl. 179—171)

This invention relates to a circuit-arrangement for amplifying electrical signals, and more particularly to a circuit arrangement for amplifying television signals, in which arrangement the signal to be amplified is applied to a low-pass filter comprising capacitative parallel branches.

For various purposes, particularly for transmitting television signals, it is desirable to have amplifying circuits in which the wave forms of output voltages or currents are as nearly as possible replicas of the input wave forms.

As is well-known, the use of circuits including discharge tubes for amplifying pulse-shaped voltages with very steep fronts presents serious difficulties with respect to fidelity of reproduction. These difficulties are due to the presence of parasitic parallel capacities of the electrodes of the tube and circuit elements. These parasitic capacities constitute short-circuits for very high frequencies and produce rounding of rectangular pulse fronts.

As a rule, reduction of these effects is achieved by using coupling networks between the tubes, the networks being designed so that the frequency characteristic curve of the amplifier is flat over the largest possible range.

Networks of the low-pass filter type, wherein the parasitic capacities are intentionally incorporated as parallel branches, are known.

It is an object of the invention to provide an amplifier having a substantially flat response characteristic over an extended frequency range.

It is another object of the invention to provide a video amplifier in which the effects of parasitic capacitance are substantially eliminated. The invention will be described with reference to the drawing in which.

Figure 1:
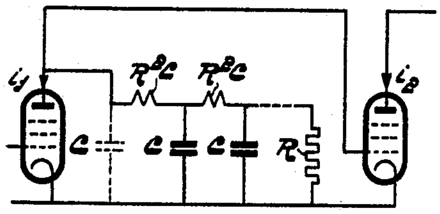
Fig. 1 is a video amplifier employing a two-section low pass filter of the conventional type.
Figure 2:
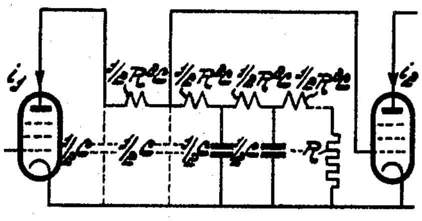

The networks represented in Figures 1 and 2, which comprise infinitely long low-pass filters of the basic type, constitute, with respect to band-width, the most ideal solutions for the coupling network, since the frequency characteristic curve may be perfectly flat up to a given limiting frequency. These networks comprise series-connected inductances and capacities interposed in parallel branches, the filter being terminated by a resistance.

Figure 3:
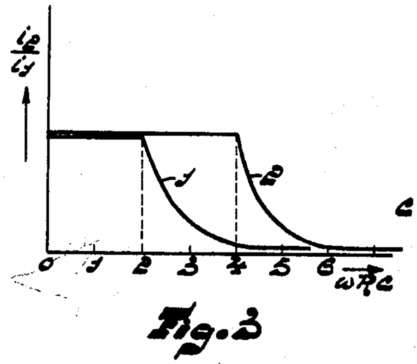
Fig. 3 is a curve showing the relationship between the input and output currents and the network constants for conventional amplifiers shown in Figs. 1 and 2.

In this event the four-pole network shown in Fig. 2, assuming that the total parasitic capacity C (which is the sum of the anode capacity of the preceding tube, the grid capacity of the following tube, and the ground capacity of coupling elements, wiring and so on), can be divided into two equal halves ½C, has, with the same amplification, a band-width which is twice as large as that of the bipolar network shown in Fig. 1; this appears from Fig. 3 (curves 2 and 1 respectively), in which the absolute value of the ratio of the current strengths $i_2$ and $i_1$ is plotted against RC.

It appears, however, that these and other methods in which it is attempted to secure as flat a frequency characteristic as possible, are unsuitable for faithful transmission of the pulse-shaped signals which are frequently used in television, since the so-called jump function exhibits unduly large oscillations even when using a single amplification stage thus proportioned. This effect is further aggravated if a number of such stages are used in cascade arrangement.

Figure 4:
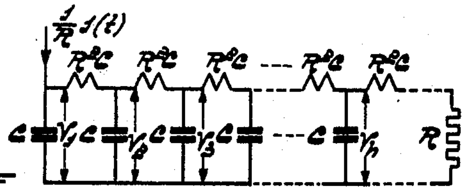
Fig. 4 is an iterative low pass network.

This follows from the network shown in Fig. 4, in which the character of the voltages $V_1$, $V_2$, $V_3$, $V_n$ across the first, second, third and nth parallel condenser respectively is examined, if, at the beginning of the network, a rectangular voltage leap of $$\frac{1}{R}1(t)$$

occurs. $1(t)$ should be understood to mean the so-called unit voltage of Heaviside.

As may be shown in a simple manner, we generally find for the operator equation:

$$V_n(t) \doteq \left(\sqrt{1+\left(\frac{p}{2}\right)^2}-\frac{p}{2}\right)^{2n-1} \qquad (1)$$

in which $$p=RC\frac{d}{dt}=\frac{d}{d\left(\frac{t}{RC}\right)} \qquad (2)$$

The solution of this operator equation is as follows:

$$V_n(t)=(2n-1)\int_0^{\frac{2t}{RC}}\frac{J_{2n-1}(x)}{x}dx \qquad (3)$$

in which $J_{2n-1}$ represents the Bessel function of the first kind and $(2n-1)$-th order.

Figure 5:
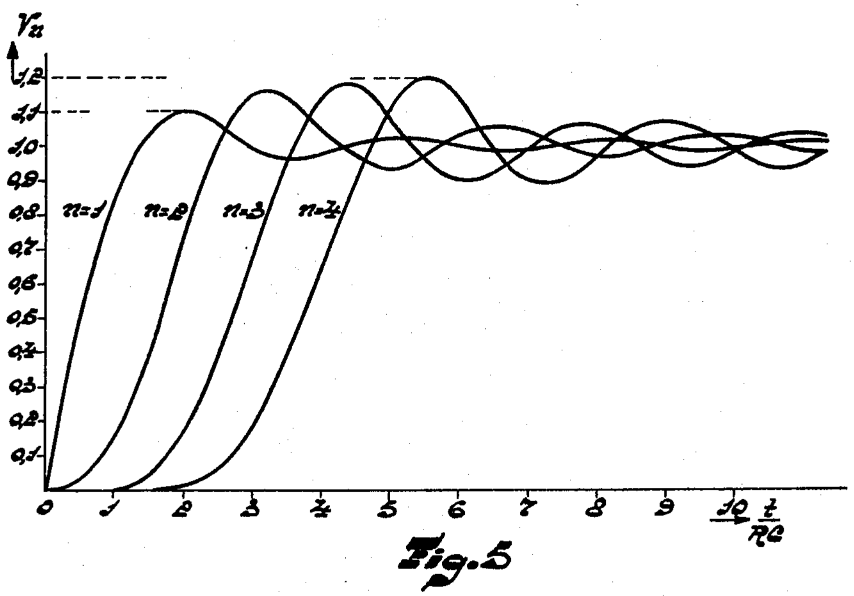
Fig. 5 is a curve showing voltage output across successive sections of the network shown in Fig. 4.

Fig. 5 illustrates the result of the numerical calculation of this integral for different values of $n$. From this it appears that the curve for $n=1$ (which consequently holds for Fig. 1) over-oscillates by approximately 10%, and that for $n=2$ (according to Fig. 2) this amount is approximately 16%. At the same time the oscillation phenomenon is comparatively feebly damped. These effects are very annoying when amplifying television signals.

In accordance with the present invention, the output voltage is obtained by the algebraic summation of voltages which are developed across at least two parallel branches of the filter, which voltages include oscillatory components. The oscillatory components of successive voltages are in phase opposition. In other words, the input voltage to be amplified is applied to an interative low pass network having parallel capacitive branches and the voltage components developed at successive sections are summed in such manner that oscillation components are in phase opposition from each other, thus damping undesired oscillations in the output voltage.

In this event use is made of the fact that the oscillation phenomena which occur in the jump function $V_n$ and $V_{n+1}$ are in phase opposition for high values of $$\frac{t}{RC}$$

This appears from the asymptotic development of the Bessel function:

$$J_{2n-1}(x)\approx(-1)^n\frac{\cos\left(x+\frac{\pi}{4}\right)}{\sqrt{0.5\pi x}} \text{ for } x\gg 1 \qquad (4)$$

Consequently, superposition of parts of the voltages at two or more succeeding parallel condensers of the network permits a resulting jump function to be obtained, which jump function exhibits a better form. This superposition may, for instance, be effected by supplying each of the said voltages to the control grids of respective tubes. These tubes may be, for instance, pentodes, the anode currents of which are summated. This may be accomplished, for instance, by parallel-connection of the anodes, the different parts of these voltages being obtained by means of different mutual conductances of the tubes.

If the part of the jump function be $V_n(t)g_n$ and the summation extends from $n=i$ to $n=k$ inclusive, where $n$ stands for the numerical position in the filter of the parallel condenser from which a voltage is taken; $i$, the number of the first parallel condenser; $k$, the number of the last parallel condenser; and $g_n$ the part of a voltage taken from the $n$th condenser, then the resultant $V(t)$ is:

$$V(t)=\sum_{n=i}^{n=k}g_nV_n(t) \qquad (5)$$

In general the $k-i+1$ factors $g_i-g_k$ can be determined from as many equations which are obtained from the conditions:

$$\left.\begin{array}{r}V(t)=1\\ V'(t)=0\\ V''(t)=0\\ \vdots\\ V^{(k-i)}_{(t)}=0\end{array}\right\} \text{ for } t\gg RC \qquad (6)$$

By means of (3) and (4), and the expression:

$$J'_p(x)=J_{p-1}(x)-\frac{p}{x}J_p(x) \qquad (7)$$

we find upon reduction the following relations from which $g_i$ to $g_k$ inclusive can be determined.

$$\left.\begin{array}{r}\sum_{n=i}^{k}g_n=1\\ \sum_{n=i}^{k}(-1)^n(2n-1)g_n=0\\ \sum_{n=i}^{k}(-1)^n(2n-1)^2g_n=0\\ \sum_{n=i}^{k}(-1)^n(2n-1)^3g_n=0\\ \vdots \quad \text{etc.} \quad \vdots\\ \sum_{n=1}^{k}(-1)^n(2n-1)^{k-i}g_n=0\end{array}\right\} \qquad (8)$$

Figure 6:
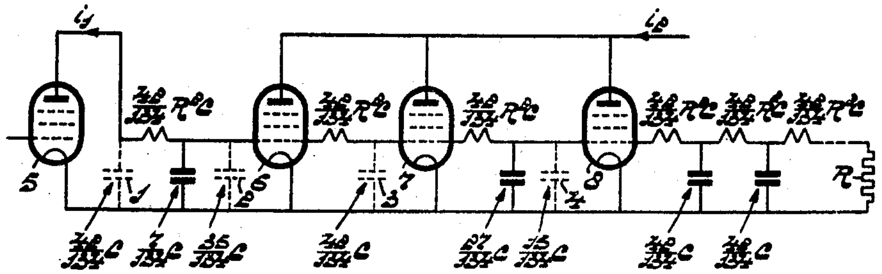
Fig. 6 is a video amplifier according to the invention.

This will be explained by giving an example which is illustrated in Fig. 6, in which $i=2$, $k=4$ hence:

$$\left.\begin{array}{r}g_2+g_3+g_4=1\\ 3g_2-5g_3+7g_4=0\\ 9g_2-25g_3+49g_4=0\end{array}\right\} \text{ so that: } \begin{array}{l}g_2=\frac{35}{92}\\ g_3=\frac{42}{92}\\ g_4=\frac{15}{92}\end{array}$$

The voltages set up at the condensers 2, 3 and 4 of the low pass filter, together with the aforesaid calculated factors, are supplied to the control grids of the tubes 6, 7 and 8, the anodes of which are connected in parallel. The mutual conductances of tubes 6, 7 and 8 are proportional to the calculated $g_n$ factors for the corresponding filter sections. Assuming that the grid capacities of these tubes are related as the factors, and furthermore that the anode capacity of tube 5 can be chosen to be equal to the highest grid capacity, and that the parasitic capacities total C, we find for the anode capacity $$\frac{42}{134}C$$

and for the grid capacities of 6, 7 and 8

$$\frac{35}{134}C,\ \frac{42}{134}C \text{ and } \frac{15}{134}C$$

respectively. To equalize all parallel condensers capacities equal to $$\frac{7}{134}C \text{ and } \frac{27}{134}C$$

must consequently be provided at the grids of 6 and 8 respectively.

To the right the filter should be imagined to extend infinitely long. The series inductances are made equal to $$\frac{42}{134}R^2C$$

in order to obtain a characteristic impedance equal to R.

Figure 7:
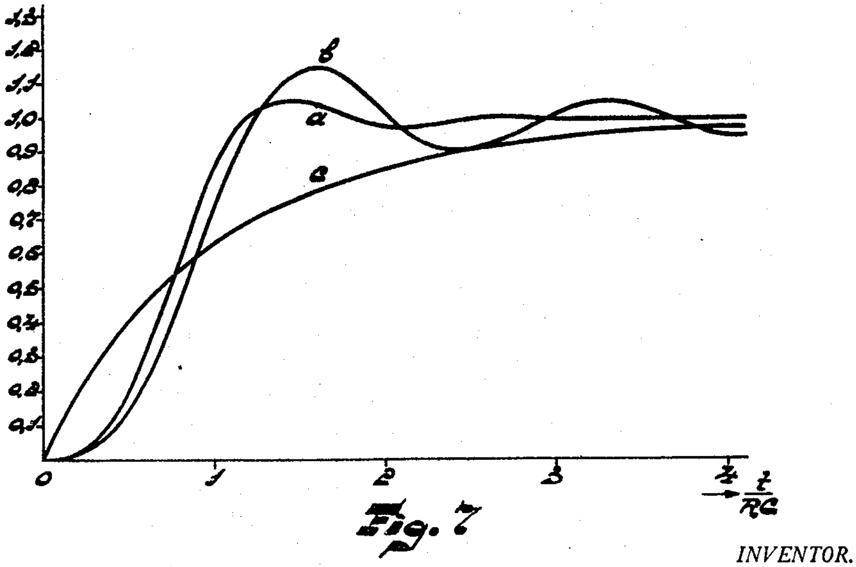
Fig. 7 is a curve showing the voltage output of an amplifier according to the invention.

The jump function of the circuit-arrangement thus obtained is represented in Fig. 7 by the curve *a*.

For comparison, the curve *b* in the same figure represents the jump function which is obtained by means of the circuit shown in Fig. 2 which, as has already been pointed out, has the greatest "bandwidth" which is obtainable with a total parasitic capacity C and termination with the same value of R. Curve C represents the jump characteristic for the non-corrugated network.

From Fig. 7, it clearly appears that the use of the circuit according to the invention yields a material reduction of the overoscillation effect and, moreover, an improvement of the starting mutual conductance.

The circuit shown in Fig. 6 comprises more tubes, it is true, but the total mutual conductance thereof may be equal to that of one tube shown in Fig. 2. According to the invention tubes 6, 7 and 8 may be incorporated in one and the same tube, in which only the control grids need be separated. The effect of the latter on the total anode current may be chosen to be proportional to the desired factor which, according to the invention, is ensured by a judicious choice of the length and pitch of each grid.

In the foregoing an infinitely long low-pass filter is concerned. In practice, however, filters comprising a finite number of elements may be used which are terminated in a known manner by approximated image impedances.

What I claim is:

1. A broad band amplifier, comprising a low pass iterative filter network having a plurality of sections, each of said sections including a capacitative parallel branch and having a predetermined $g_n$ factor, means to apply a signal voltage to the input of said network to develop a plurality of voltages each across one of successive parallel branches of said network, each of said voltages having an undesired oscillatory component and a desired voltage component, the oscillatory components of succeeding voltages being in phase opposition, a plurality of electron discharge tubes each having cathode, control and anode electrodes, means to apply to the control electrodes of each of said tubes the voltage developed across a respective parallel branch of said filter, the mutual conductances of said tubes being proportional to the $g_n$ factors for the corresponding filter sections, said $g_n$ factors of succeeding sections of said filter being chosen in such manner that $$\sum_{n=i}^{k} g_n = 1$$

$$\sum_{n=i}^{k} (-1)^n (2n-1) g_n = 0$$

$$\sum_{n=i}^{k} (-1)^n (2n-1)^2 g_n = 0$$

$$\vdots$$

$$\sum_{n=i}^{k} (-1)^n (2n-1)^{k-i} g_n = 0$$

where $n$ is the number of a parallel branch across which a praticular voltage is developed, $i$ and $k$ respectively are the numbers of the first and last parallel branches across which voltages are developed, and $g_n$ is a predetermined component of the voltage across a parallel branch, and means to directly connect said anodes in parallel to produce a resultant output voltage which is the algebraic sum of said desired components.

2. A broad band amplifier, comprising a low pass iterative filter network having a plurality of sections, each of said sections including a capacitative parallel branch and having a predetermined $g_n$ factor, means to apply a signal voltage to the input of said network to develop a plurality of voltages each across one of successive parallel branches of said network, each of said voltages having an undesired oscillatory component and a desired voltage component, the oscillatory components of succeeding voltages being in phase opposition, a plurality of electron discharge tubes each having cathode, control and anode electrodes, means to apply to the control electrodes of each of said tubes the voltage developed across a respective parallel branch of said filter, the mutual conductances from the output to the input of said tubes being proportional to the $g_n$ factors for the corresponding filter sections, said $g_n$ factors of succeeding sections of said filter being chosen in such manner that $$\sum_{n=i}^{k} g_n = 1$$

$$\sum_{n=i}^{k} (-1)^n (2n-1) g_n = 0$$

$$\sum_{n=i}^{k} (-1)^n (2n-1)^2 g_n = 0$$

$$\vdots$$

$$\sum_{n=i}^{k} (-1)^n (2n-1)^{k-1} g_n = 0$$

where $n$ is the number of a parallel branch across which a particular voltage is developed, $i$ and $k$ respectively are the numbers of the first and last parallel branches across which voltages are developed, and $g_n$ is a predetermined component of the voltage across a parallel branch, and means to directly connect said anodes in parallel to produce a resultant output voltage which is the algebraic sum of said desired components.

3. A broad band amplifier, comprising a low pass filter network having a plurality of capacitative parallel branches, means to apply a signal voltage to the input of said network, means to derive a plurality of voltages each across one of successive parallel branches of said network, each of said voltages having an oscillatory component and a desired component, the oscillatory components of succeeding voltages being in phase opposition, and means to combine said desired components algebraically to produce a resultant output voltage, the respective values of each of said desired components being chosen so that:

$$\sum_{n=i}^{k} g_n = 1$$

$$\sum_{n=i}^{k} (-1)^n (2n-1) g_n = 0$$

$$\sum_{n=i}^{k} (-1)^n (2n-1)^2 g_n = 0$$

$$\vdots$$

$$\sum_{n=i}^{k} (-1)^n (2n-1)^{k-i} g_n = 0$$

where $n$ is the number of a parallel branch across which a particular voltage is developed, $i$ and $k$ respectively are the numbers of the first and last parallel branches across which the voltages are developed and $g_n$ is a predetermined component of the voltage across a particular branch.

GERRIT JAN SIEZEN.

REFERENCES CITED

The following references are of record in the file of this patent:

UNITED STATES PATENTS

| Number | Name | Date |
|---|---|---|
| 2,172,354 | Blumlein | Sept. 12, 1939 |
| 2,227,906 | Kellogg | Jan. 7, 1941 |
| 2,263,376 | Blumlein et al. | Nov. 18, 1941 |
| 2,266,154 | Blumlein | Dec. 16, 1941 |
| 2,273,163 | Wilson | Feb. 17, 1942 |